United States Patent Office 3,440,254
Patented Apr. 22, 1969

3,440,254
METALLIFEROUS AZOMETHINE PIGMENTS
Maurice Auguste Jacques Lenoir, Paris, Roland Michael Lanzarone, Garges-les-Gonesse, and Madeleine Georgette Maigrot, Paris, France, assignors to Ugine Kuhlmann, Paris, France
No Drawing. Filed Dec. 28, 1966, Ser. No. 605,163
Claims priority, application France, Jan. 4, 1966, 44,782
Int. Cl. C09b 55/00
U.S. Cl. 260—429                    13 Claims

ABSTRACT OF THE DISCLOSURE

Metallisable dyestuffs preferably prepared by condensing a 2-hydroxy-3-carboxy-1-naphthaldehyde or a halogenated derivative thereof with an aromatic ortho- or peri-aminocarboxylic acid and having the formula

A—N=CH—B or

B—HC=N—A'—N=CH—B wherein B is an unsubstituted 3-carboxy-2-hydroxy-naphthyl radical or such a radical substituted in any of the 5 to 8 positions by a halogen atom, A is an unsubstituted ortho-carboxyphenyl, ortho-carboxynaphthyl or peri-carboxynaphthyl radical, or such a radical substituted by at least one halogen atom or alkyl, alkoxy, nitro, or sulphonamido-N-substituted group, A' is an unsubstituted O,O'-dicarboxydiphenylene, monocarboxyphenylene or dicarboxy-phenylene radical, or such a radical substituted by any of the groups substituted in the radical A.

---

The present invention concerns metalliferous azomethine pigments.

Azomethine dyestuffs derived from 2-hydroxy-3-carboxy-1-naphthaldehyde have already been described and claimed in U.S. patent application No. 545,305 and now abandoned. These dyestuffs are products resulting from the condensation of two molecules of 2-hydroxy-3-carboxy-1-naphthaldehyde with one molecule of a para-arylenediamine or a diphenyldiamine.

It has now been found that the condensation of 2-hydroxy-3-carboxy-1-naphthaldehyde or its halogenated derivatives with aromatic ortho-aminocarboxylic or peri-aminocarboxylic acids gives azomethine dyestuffs capable of being metallised and that the dyestuffs when metallised have in general excellent fastness, making them suitable for very diverse applications in the pigment field.

The metallisable dyestuffs according to the invention may be represented by the following general formulae:

A—N=CH—B           (I)

B—HC=N—A'—N=CH—B   (II)

in which B represents a 3-carboxy-2-hydroxy-naphthyl radical which may be substituted by a halogen atom in any of the positions 5 to 8, A represents an ortho-carboxyphenyl or ortho- or peri-carboxynaphthyl radical, and A' represents an O,O'-dicarboxydiphenylene, mono-carboxy-phenylene or dicarboxyphenylene radical, the radicals A and A' being able to be substituted by halogen atoms or alkyl, alkoxy, nitro or sulphonamido-N-substituted groups.

The condensation of 2-hydroxy-3-carboxy-1-naphthaldehyde or its halogenated derivatives with aromatic ortho- or peri-aminocarboxylic acids may, for example, be effected in alcoholic medium or in another solvent or in aqueous medium. In the last case, for example, the aqueous solutions of the sodium salts of the starting materials are mixed and the condensation is brought about by acidifying the mixture. This condensation may in some cases be carried out hot. Examples of suitable aminocarboxylic acids which may be used for carrying out the process according to the invention are anthranilic acid, 3-amino-2-naphthoic acid, 8-amino-1-naphthoic acid, and 4,4'-diamino-3,3'-diphenyldicarboxylic acid.

The metals used for the metallisation of the dyestuffs of Formulae I and II are nickel, cobalt, iron or chromium but preferably copper, manganese, aluminium, zinc or cadmium. The metallisation may be carried out, for example, in aqueous medium by means of water-soluble salts of these metals. The medium is made slightly acid, buffered for example with sodium acetate. Prolonged heating at near boiling point brings about the metallisation.

The metalliferous pigments of the dyestuffs of Formulae I and II constitute a wide range comprising green-yellow, yellow-green, yellow, orange, red and brown pigments. They are mostly very fast to light and in general have good fastness to solvents. These qualities often accompany an excellent resistance to migration in plastic materials, which in particular enables them to be used in plasticised polyvinyl chloride. Owing to their very good fastness to overvarnishing and to heat, a number of them can also be used in car body paints. They are also suitable for the preparation of printing inks.

The invention is illustrated by, but not limited to the following examples in which the parts given are parts by weight.

EXAMPLE 1

216 parts of 2-hydroxy-3-carboxy-1-naphthaldehyde are dissolved in 4000 parts of boiling ethanol. Into the solution thus obtained, kept under agitation, is introduced a solution of 137 parts of anthranilic acid in 1200 parts of ethanol, over a period of 15 minutes at a temperature of 60 to 70° C. Stirring at this temperature is maintained for two hours. The orange dyestuff which has precipitated is filtered off, washed with ethanol and then with water.

The filter cake obtained is suspended in 4000 parts of water. A solution of 816 parts of crystalline sodium acetate in 2500 parts of water, then a solution of 341 parts of cupric chloride, $CuCl_2 \cdot 2H_2O$, in 1000 parts of water is added to the suspension, while stirring. The suspension is heated to 90 to 95° C. while stirring is continued. The colour of the suspension changes progressively to yellow-green. After maintaining the stirring and the temperature of 90 to 95° C. for 15 to 16 hours, the pigment is filtered off, washed on the filter with 10,000 parts of water and dried at 65° C. A yellow-green powder is obtained.

The same result is obtained if the 341 parts of cupric chloride in the previous preparation are replaced by 500 parts of copper sulphate, $CuSO_4 \cdot 5H_2O$.

The pigment thus obtained colours nitrocellulose varnishes a green-yellow shade which is very fast to light. When used in printing inks, it gives on printing a brilliant green-yellow shade with good fastness to light. It disperses well in polyvinyl chloride plasticised with dioctyl phthalate, which it also colours green-yellow. Its resistance to migration and its fastness to light are excellent. This green-yellow pigment is also of interest for glycerophthalic-formaldehyde-melamine paints polymerised by stoving. In this case it shows perfect stability to heat, after 30 minutes at 180° C. Its fastness to over-varnishing is also perfect under the usual conditions for finishing car bodies (30 minutes at 165° C.).

EXAMPLE 2

216 parts of 2-hydroxy-3-carboxy-1-naphthaldehyde are dissolved in 5000 parts of water with 44 parts of sodium hydroxide (solution A).

On the other hand 137 parts of anthranilic acid are dissolved in 3000 parts of water with 40 parts of sodium hydroxide (solution B).

Solution B is introduced with stirring into solution A to which has been added 5 parts of the product resulting from the condensation of 8 molecules of ethylene oxide with one molecule of dodecyl alcohol. The mixture is heated to 90° C. 770 parts of 17% hydrochloric acid are added in a period of 15 minutes. After the stirring and the temperature have been maintained for about half an hour, the orange precipitate is filtered hot and washed with water. The dyestuff obtained is identical with that of Example 1 and may be metallised according to one of the processes described in Example 1.

EXAMPLE 3

The orange dyestuff prepared according to Example 1 or 2 is suspended in 10,000 parts of water, and to the stirred suspension are added a solution of 408 parts of crystalline sodium acetate in 1200 parts of water and a solution of 250 parts of copper sulphate, $CuSO_4 \cdot 5H_2O$, in 850 parts of water. The vigorously stirred mixture is heated for 16 hours at 95 to 100° C. During the heating the colour of the suspension turns to brown. The pigment thus formed is filtered off, washed with 10,000 parts of water and dried at 65° C. A brown powder is obtained.

This pigment, which differs from that of Example 1 by its smaller content of copper, colours nitrocellulose varnishes khaki, its fastness to light being excellent, both in the full colour and diluted with titanium oxide (5 parts of $TiO_2$ to 1 part of pigment). This same pigment colours polyvinyl chloride plasticised with dioctyl phthalate a brown-yellow shade. In this material it shows no tendency to migration and has an excellent fastness to light.

EXAMPLE 4

A solution of 295 parts of 6-bromo-2-hydroxy-3-carboxy-1-naphthaldehyde in 5000 parts of water at 95° C. with 88 parts of sodium hydroxide is prepared, and to this well stirred solution are added 5 parts of the product resulting from the condensation of 8 molecules of ethylene oxide with one molecule of dodecyl alcohol, then a solution of 159 parts of sodium anthranilate in 3000 parts of water. The mixture is heated to 90° C. and 1000 parts of 17% hydrochloric acid are added in a period of 15 minutes. After the stirring and the temperature of 90° C. have been maintained for half an hour, the orange precipitate is filtered off hot and washed on the filter with water.

The filter cake is suspended in 10,000 parts of water. A solution of 816 parts of crystalline sodium acetate in 2,500 parts of water, then a solution of 500 parts of copper sulphate, $CuSO_4 \cdot 5H_2O$, in 1,700 parts of water are added with good stirring. The mixture is heated at 95 to 100° C. for 16 hours. The green-yellow precipitate obtained is filtered hot, washed on the filter with water and dried at 65° C.

The pigment thus obtained colours nitrocellulose varnishes and plasticised polyvinyl chloride green-yellow. Its fastness to light and its resistance to migration are very good.

EXAMPLE 5

The orange dyestuff obtained according to Example 1 or 2 is metallised by operating as in Example 1 with the sole difference that the copper salt is replaced by 446 parts of manganese sulphate, $MnSO_4 \cdot 4H_2O$.

An orange manganiferous pigment is obtained, with very good fastness to light. This pigment is particularly suitable for the coloration of varnishes and printing inks. Its fastness to over-varnishing is perfect in a glycerophthalic-formaldehyde-melamine varnish polymerised by stoving. It has a good resistance to migration in plasticised polyvinyl chloride.

EXAMPLE 6

The orange dyestuff prepared according to Example 1 or 2 is metallised by the process of Example 1, but the copper salt is replaced by 333 parts of aluminium sulphate, $Al_2(SO_4)_3 \cdot 18H_2O$.

The pigment thus obtained colours varnishes bright reddish-yellow and polyvinyl chloride plasticised with dioctyl phthalate bright golden yellow. In this plasticised polyvinyl chloride it has an excellent resistance to migration.

EXAMPLE 7

The orange dyestuff prepared according to Example 1 or 2 is metallised by operating as in Example 1, but replacing the copper salt by 574 parts of zinc sulphate, $ZnSO_4 \cdot 7H_2O$.

A pigment is obtained which colours nitrocellulose varnishes bright yellowish orange, having a very good fastness to light, both in the full colour and when diluted with titanium oxide.

EXAMPLE 8

336 parts of N-(4-amino-3-carboxybenzenesulphonyl)-2-aminobenzoic acid are dissolved in 5,000 parts of water with 88 parts of sodium hydroxide. The solution obtained is mixed with a solution of 2-hydroxy-3-carboxy-1-naphthaldehyde prepared by dissolving 216 parts of this aldehyde in 5000 parts of water with 44 parts of sodium hydroxide and 5 parts of the product resulting from the condensation of 8 molecules of ethylene oxide with one molecule of dodecyl alcohol.

1030 parts of 17% hydrochloric acid are introduced in a period of 15 minutes into the mixture maintained with stirring at a temperature of 20 to 25° C. It is then stirred for two hours, the orange precipitate is filtered off and washed on the filter with water.

The filter cake is made into a paste in 10,000 parts of water and, while stirring vigorously, there are added successively 816 parts of crystalline sodium acetate dissolved in 2500 parts of water and then 500 parts of copper sulphate, $CuSO_4 \cdot 5H_2O$, dissolved in 1700 parts of water. The suspension is heated for 16 hours at 95 to 100° C. and its colour turns to brown. It is filtered hot and the solid is washed on the filter with 10,000 parts of water and dried at 65° C.

The pigment thus obtained is a yellow-brown powder which colours nitrocellulose varnishes a brown-yellow shade endowed with an excellent fastness to light, both in the full colour and when diluted with titanium oxide (5 parts of $TiO_2$ to 1 part of pigment). It colours polyvinyl chloride plasticised with octyl phthalate, in which it does not migrate at all, an orange brown has a very good fastness to light.

EXAMPLE 9

187 parts of 3-amino-2-naphoic acid are dissolved in the hot in 1600 parts of ethanol and 60 parts of glacial acetic acid. The solution obtained is introduced into a solution of 216 parts of 2-hydroxy-3-carboxy-1-naphthaldehyde in 4000 parts of ethanol. The reaction, effected at 60–70° C., gives rise to an orange dyestuff which is precipitated. After stirring for some minutes, the precipitate is filtered off, then washed successively with ethanol and water.

When converted into cupriferous pigment according to one of the processes of Example 1, it gives a green-yellow pigment. When metallised according to the process of Example 5, it gives an orange red manganiferous pigment.

EXAMPLE 10

187 parts of 8-amino-1-naphthoic acid and 216 parts of 2-hydroxy-3-carboxy-1-naphthaldehyde are made into a paste in 3600 parts of water containing 120 parts of sodium hydroxide. The mixture is raised slowly to ebullition until complete solution takes place.

To the solution, rapidly cooled to 0° C., are added with vigorous stirring 190 parts of acetic acid previously diluted with 460 parts of water. A reddish yellow dyestuff precipitates, which is filtered off and washed successively with alcohol, then with water.

On treating with a copper salt according to one of the methods of Example 1, a green-yellow cupriferous pigment is obtained. On carrying out the metallisation as in Example 5, a red-orange manganiferous pigment is obtained.

The following table describes a number of metalliferous pigments obtained by condensing an aminocarboxylic acid with 2-hydroxy-3-carboxy-1-naphthaldehyde and metallising according to processes analogous to those mentioned above.

| No. | Aminocarboxylic acid | Metal | Shade |
|---|---|---|---|
| 11 | 4-chloro-2-amino-benzoic acid | Copper | Green-yellow. |
| 12 | do | Manganese | Red orange. |
| 13 | do | Nickel | Orange. |
| 14 | 5-chloro-2-amino-benzoic acid | Copper | Yellow-brown. |
| 15 | do | Manganese | Red-orange. |
| 16 | do | Aluminium | Yellow-orange. |
| 17 | 6-chloro-2-amino-benzoic acid | Copper | Yellow-green. |
| 18 | do | Manganese | Orange-yellow. |
| 19 | 4-methyl-2-amino-benzoic acid | Copper | Green-yellow. |
| 20 | 5-methoxy-2-amino-benzoic acid | do | Brown. |
| 21 | 5-nitro-2-amino-benzoic acid | do | Do. |
| 22 | do | Manganese | Red. |
| 23 | Anthranilic acid | Chromium | Orange. |
| 24 | do | Iron | Chestnut. |
| 25 | do | Cobalt | Brown. |
| 26 | do | Nickel | Yellow. |
| 27 | 4,4'-diamino-diphenyl-3,3'-dicarboxylic acid | Copper | Brown. |
| 28 | do | Manganese | Red-brown. |
| 29 | 2,5-diamino-benzoic acid | do | Brown-red. |
| 30 | do | Zinc | Brown. |
| 31 | 2,5-diamino-terephthalic acid | Manganese | Dark bordeaux. |
| 32 | Anthranilic acid | Cadmium | Orange yellow. |

Among these pigments, the compounds 14, 17, 21 and 22 are distinguished by their particularly good fastness to light and resistence to migration.

We claim:

1. Metallisable dyestuffs of either of the following formulae:

$$A-N=CH-B$$

$$B-HC=N-A'-N=CH-B$$

wherein B represents an unsubstituted 3-carboxy-2-hydroxynaphthyl radical or such a radical substituted in any of the positions 5 to 8 by a halogen atom, A represents an unsubstituted ortho-carboxyphenyl, ortho-carboxynaphthyl or peri-carboxynaphthyl radical, or such a radical substituted by at least one halogen atom or alkyl, alkoxy, nitro or sulphonamido-N-substituted group, and A' represents an unsubstituted o,o'-dicarboxydiphenylene, monocarboxy-phenylene, or dicarboxy-phenylene radical, or such a radical substituted by at least one halogen atom or alkyl, alkoxy, nitro or sulphonamido-N-substituted group.

2. Metallisable dyestuffs of either of the following formulae:

$$A-N=CH-B$$

$$B-HC=N-A'-N=CH-B$$

wherein B represents an unsubstituted 3-carboxy-2-hydroxynaphthyl radical or such a radical substituted in any of the positions 5 to 8 by a halogen atom, A represents an unsubstituted ortho-carboxyphenyl, ortho-carboxynaphthyl or peri-carboxynaphthyl radical or such a radical substituted by at least one halogen atom or alkyl, alkoxy, nitro or sulphonamido-N-substituted group and A' represent an unsubstituted o,o'-dicarboxydiphenylene radical or such a radical substituted by at least one halogen atom or alkyl, alkoxy, nitro or sulphonamido-N-substiuted group.

3. Metallisable dyestuffs of the formula $$A-N=CH-B$$

wherein B represents an unsubstituted 3-carboxy-2-hydroxynaphthyl radical or such a radical substituted in any of the positions 5 to 8 by a halogen atom, A represents an unsubstituted ortho-carboxyphenyl radical or such a radical substituted by at least one halogen atom or alkyl, alkoxy, nitro or sulphonamido-N-substituted group.

4. Metalliferous derivatives of the dyestuffs claimed in claim 1 wherein the metal is copper, manganese, aluminium or zinc.

5. Metalliferous derivatives of the dyestuffs claimed in claim 1 wherein the metal is cadmium.

6. Metalliferous derivatives of the dyestuffs claimed in claim 1 wherein the metal is nickel, cobalt, iron or chromium.

7. Metalliferous derivatives of the dyestuffs claimed in claim 2 wherein the metal is copper, manganese, aluminium or zinc.

8. Metalliferous derivatives of the dyestuffs claimed in claim 2 wherein the metal is cadmium.

9. Metalliferous derivatives of the dyestuffs claimed in claim 2 wherein the metal is nickel, cobalt, iron or chromium.

10. The dyestuff of the formula:

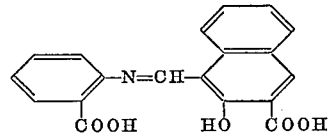

11. The copper complex of the dyestuff claimed in claim 10.

12. The manganese complex of the dyestuff claimed in claim 10.

13. The zinc complex of the dyestuff claimed in claim 10.

References Cited

UNITED STATES PATENTS

| 2,276,158 | 3/1942 | Chenicek | 44—92 |
| 2,405,886 | 8/1946 | Hardman | 260—566 |
| 3,375,240 | 3/1968 | Beffa, et al. | 260—145 |

FOREIGN PATENTS

| 1,297,561 | 5/1962 | France. |

TOBIAS E. LEVOW, *Primary Examiner.*

A. P. DEMERS, *Assistant Examiner.*

U.S. Cl. X.R.

8—55, 57; 106—22, 288, 292, 301, 302, 304; 260—37, 429.9, 438.1, 438.5, 439, 448, 519, 566